(12) United States Patent
Tsuga (10) Patent No.: US 6,878,087 B2
(45) Date of Patent: Apr. 12, 2005

(54) SPEED CHANGE MECHANISM OF AUTOMATIC TRANSMISSION

(75) Inventor: Koichiro Tsuga, Shizuoka (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 10/446,869

(22) Filed: May 29, 2003

(65) Prior Publication Data

US 2004/0014550 A1 Jan. 22, 2004

(30) Foreign Application Priority Data

Jul. 16, 2002 (JP) ........................................ 2002-207290

(51) Int. Cl.$^7$ .............................................. F16H 3/44
(52) U.S. Cl. ...................................................... 475/284
(58) Field of Search ................................. 475/275, 284

(56) References Cited

U.S. PATENT DOCUMENTS

2003/0224899 A1 * 12/2003 Ishimaru et al. ............ 475/275

FOREIGN PATENT DOCUMENTS

JP   2000-55152 A   2/2000

OTHER PUBLICATIONS

U.S. Appl. No. 10/619,724, filed Jul. 16, 2003, Ishimaru.
U.S. Appl. No. 10/614,827, filed Jul. 9, 2003, Tsuga.
U.S. Appl. No. 10/619,559, filed Jul. 16, 2003, Taguchi.
U.S. Appl. No. 10/617,788, filed Jul. 14, 2003, Choi.
U.S. Appl. No. 10/619,459, filed Jul. 16, 2003, Ishimaru.
U.S. Appl. No. 10/617,787, filed Jul. 14, 2003, Ikeda.

* cited by examiner

Primary Examiner—Dirk Wright
(74) Attorney, Agent, or Firm—Foley & Lardner LLP (57) ABSTRACT

A single pinion type planetary gear unit and a double sun gear type planetary gear units are coaxially arranged on different positions of a given axis of an input shaft. First and second brakes are coaxially arranged on different positions of the given axis. The first brake selectively fixes a carrier of the double sun gear type planetary gear unit and the second brake selectively fixes an outer one of the sun gears of the double sun gear type planetary gear unit. First and second clutches are coaxially arranged on different positions of the given axis to transmit a speed changed rotation to rotational elements of the two planetary gear unit to provide an associated automatic transmission with a desired speed. The first clutch transmits the speed changed rotation to the ring gear of the single pinion type planetary gear unit, and the second clutch transmits the speed changed rotation to the sun gear of the single pinion type planetary gear unit. The first and second clutches are coaxially arranged in the vicinity of the single pinion type planetary gear unit having the second clutch positioned in a space defined between the first clutch and the input shaft.

11 Claims, 6 Drawing Sheets

SPEED CHANGE MECHANISM OF AUTOMATIC TRANSMISSION

BACKGROUND OF THE INVENTION

1. Field of the Invention

The present invention relates in general to automatic transmissions for wheeled motor vehicles, and more particularly a speed change mechanism of the automatic transmissions, which comprises two planetary gear units which are coaxially arranged, two clutches which are arranged to selectively transmit a speed-changed input rotation to rotational elements of the mechanism and brakes which are arranged to selectively fix other rotational elements of the mechanism for allowing the transmission to assume a desired speed or position.

2. Field of the Related Art

Nowadays, for improving fuel consumption and drivability of the motor vehicles, the speed change mechanisms of automatic transmissions have a tendency to increase the number of speeds, viz., speed positions. One of them is shown in Laid-open Japanese Patent Application (Tokkai) 2000-55152, which comprises a planetary gear unit that mainly reduces the speed of rotation transmitted from the engine, a speed change mechanism that is arranged behind the planetary gear unit, two direct clutches that are capable of directly transmitting the rotation of the engine to rotational elements of the speed change mechanism and brakes that are capable of fixing the rotational elements of the speed change mechanism, for allowing the transmission to have a plurality of speeds.

The speed change mechanism of the above-mentioned application employs a Ravigneawx type planetary gear unit. That is, by selectively engaging or disengaging the clutches and brakes in a controlled manner, the rotational elements of the speed change mechanism are arranged to constitute a power transmitting path for a desired speed.

However, due to its inherent construction, usage of the Ravigneawx type planetary gear unit as the speed change mechanism causes the mechanism to have a bulky construction, that is, a bulky construction whose size is enlarged in a radial direction. That is, for transmitting the speed reduced input rotation (viz., speed changed rotation) from the speed reducing planetary gear unit to the two sun gears of the Ravigneawx type planetary gear unit through the above-mentioned two clutches, there is a need of providing two connecting members, one being for connecting one of the clutches to one of the sun gears and the other being for connecting the other clutch to the other sun gear. However, due to inevitability in layout, the two connecting members are compelled to have axially extending portions which are concentrically overlapped on each other, which causes enlargement of the speed change mechanism in a radial direction.

SUMMARY OF THE INVENTION

It is therefore an object of the present invention to provide a speed change mechanism of an automatic transmission, which can provide the transmission with a plurality of speeds without enlarging the radial size thereof.

That is, according to the present invention, there is provided a speed change mechanism of an automatic transmission wherein a rotation from one clutch is transmitted to a sun gear of the speed change mechanism through one connecting member, a rotation from the other clutch is transmitted to a ring gear of the speed change mechanism through another connecting member, and these two connecting members are arranged at the same side of the speed change mechanism, and wherein the two connecting members have no portions that are concentrically overlapped on each other.

According to a first aspect the present invention, there is provided a speed change mechanism of an automatic transmission, which comprises a single pinion type planetary gear unit concentrically disposed on a position of a given axis and includes a sun gear, pinions meshed with the sun gear, a ring gear meshed with the pinions and a carrier rotatably carrying the pinions; a double sun gear type planetary gear unit concentrically disposed on the other position of the given axis and includes two sun gears, pinions meshed with the two sun gears, a ring gear meshed with the pinions and a carrier rotatably carrying the pinions; first and second brakes concentrically arranged on different positions of the given axis, the first brake being arranged to selectively fix the carrier of the double sun gear type planetary gear unit and the second brake being arranged to selectively fix one of the two sun gears of the double sun gear type planetary gear unit; and first and second clutches coaxially arranged on different positions of the given axis to transmit a speed changed rotation to rotational elements of the two planetary gear units to provide the automatic transmission with a desired speed, wherein the first clutch is arranged to transmit the speed changed rotation to the ring gear of the single pinion type planetary gear unit, and the second clutch is arranged to transmit the speed changed rotation to the sun gear of the single pinion type planetary gear unit; and wherein the first clutch is concentrically arranged around the single pinion type planetary gear unit, and the second clutch is coaxially arranged beside the first clutch at a position that is away from the double sun gear type planetary gear unit as compared with the single pinion type planetary gear unit.

According to a second aspect of the present invention, there is provided a speed change mechanism of an automatic transmission having an input shaft that is rotatable about an axis, the speed change mechanism comprising a single pinion type planetary gear unit concentrically disposed around a position of the axis near the input shaft and includes a sun gear, pinions meshed with the sun gear, a ring gear meshed with the pinions and a carrier rotatably carrying the pinions; a double sun gear type planetary gear unit concentrically disposed around the other position of the axis away from the input shaft and includes two sun gears, pinions meshed with the two sun gears, a ring gear meshed with the pinions and a carrier rotatably carrying the pinions, the two sun gears being an inner sun gear directed toward the input shaft and an outer sun gear directed away from the input shaft; first and second brakes coaxially arranged around different positions of the axis, the first brake selectively fixing the carrier of the double sun gear type planetary gear unit and the second brake selectively fixing the outer sun gear of the double sun gear type planetary gear unit; and first and second clutches coaxially arranged around different positions of the axis, the first clutch selectively transmitting a speed changed rotation to the ring gear of the single pinion type planetary gear unit, and the second clutch selectively transmitting a speed changed rotation to the sun gear of the single pinion type planetary gear unit, wherein the first and second clutches are arranged in the vicinity of the single pinion type planetary gear unit having the second clutch positioned in a space defined between the first clutch and the input shaft.

According to a third aspect of the present invention, there is provided a speed change mechanism of an automatic transmission having an input shaft that is rotatable about an axis, the speed change mechanism comprising a single pinion type planetary gear unit concentrically disposed around a position of the axis near the input shaft and includes a sun gear, pinions meshed with the sun gear, a ring gear meshed with the pinions and a carrier rotatably carrying the pinions; a double sun gear type planetary gear unit concentrically disposed around the other position of the axis away from the input shaft and includes two sun gears, pinions meshed with the two sun gears, a ring gear meshed with the pinions and a carrier rotatably carrying the pinions, the two sun gears being an inner sun gear directed toward the input shaft and an outer sun gear directed away from the input shaft; first and second brakes coaxially arranged around different positions of the axis, the first brake selectively fixing the carrier of the double sun gear type planetary gear unit and the second brake selectively fixing the outer sun gear of the double sun gear type planetary gear unit; first and second clutches coaxially arranged around different positions of the axis; a first connecting member through which a speed changed rotation is transmitted to the ring gear of the single pinion type planetary gear unit from the first clutch; and a second connecting member through which a speed change is transmitted to the sun gear of the single pinion type planetary gear unit from the second clutch, wherein the first and second connecting members have no portions which are concentrically overlapped around the axis.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the embodiment of the present invention will be described in detail with reference to the accompanying drawings.

Figure 1:
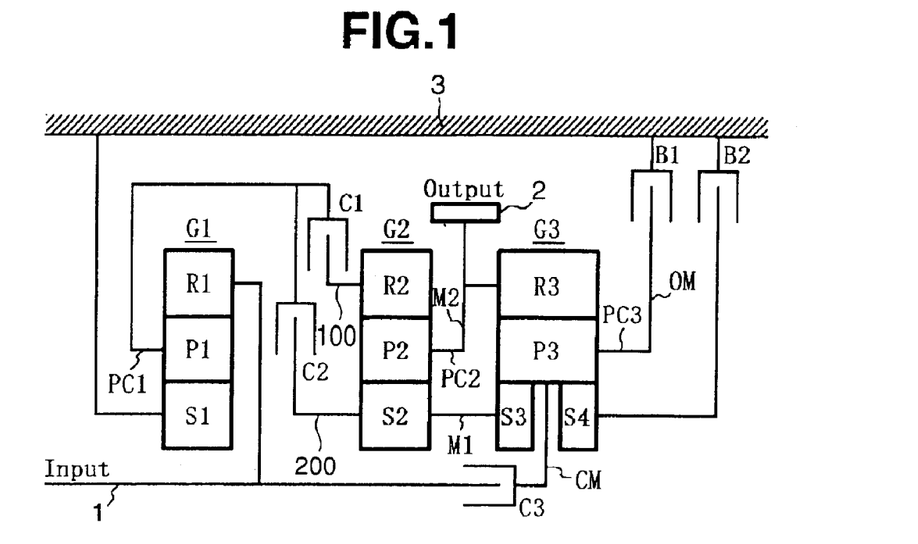
FIG. 1 is a schematic view of a speed change mechanism of an automatic transmission, which is an embodiment of the present invention.

FIG. 1 shows schematically a speed change mechanism of an automatic transmission, which is the embodiment of the present invention.

In the drawing, denoted by references G1, G2 and G3 are first, second and third planetary gear units which are coaxially arranged in order. Denoted by references M1 and M2 are first and second connecting structures, denoted by references C1, C2 and C3 are first, second and third clutches, and denoted by references B1 and B2 are first and second brakes. Denoted by references "Input" and "Output" are input and output portions, viz., an input shaft 1 and an output gear 2, respectively.

In the embodiment, the first and second planetary gear units G1 and G2 are of a single pinion type, and the third planetary gear unit G3 is of a double sun gear type.

The first planetary gear unit G1 is arranged to constitute a speed reduction mechanism and the second and third planetary gear units G2 and G3 are arranged to constitute a speed change mechanism which is arranged behind the speed reduction mechanism.

The first planetary gear unit G1 comprises a constantly fixed first sun gear S1, a first ring gear R1, first pinions P1 meshed with both the gears S1 and R1, and a first carrier PC1 rotatably holding the first pinions P1.

The second planetary gear unit G2 comprises a sun gear S2, a second ring gear R2, second pinions P2 meshed with both the gears S2 and R2, and a second carrier PC2 rotatably holding the second pinions P2.

The third planetary gear unit G3 comprises a third sun gear S3 located near the input portion "Input", a fourth sun gear S4 located a way from the input portion "Input", third pinions P3 meshed with both the third and fourth sun gears S3 and S4, a third carrier PC3 rotatably holding the third pinions P3, and a third ring gear R3 meshed with the third pinions P3.

Although the third and fourth sun gears S3 and S4 are arranged coaxially, it is not always necessary for them to have the same number of teeth.

To the third carrier PC3, there is connected a center member CM which extends radially inward between the third and fourth sun gears S3 and S4. Furthermore, to the third carrier PC3, there is connected an outer member OM which extends radially outward.

As will be described in detail hereinafter, the outer member OM has a unique arrangement.

The center member CM is arranged on a pitch circle of the third pinions P3 and has portions each extending radially inward between neighboring two of the third pinions P3. As shown, the portions of the center member CM are integral with one part of the clutch C3.

The input portion "Input" is the input shaft 1, and the input shaft 1 is connected to the first ring gear R1. Although not shown in the drawing, the input shaft 1 is driven by an engine of the vehicle through a torque converter. Thus, the power of the engine is fed to the first ring gear R1 through the torque converter and the input shaft 1.

The output portion "Output" is the output gear 2. The output gear 2 is connected with both the second carrier PC2 and the third ring gear R3 through the second connecting structure M2. Although not shown in the drawing, the output gear 2 is engaged with a final gear unit, and thus the output rotation of the output gear 2 is transmitted to driven road wheels of the vehicle through the final gear unit and a differential gear unit.

The first connecting structure M1 is a member to integrally connect the second sun gear S2 and the third sun gear S3.

As shown, the first sun gear S1 of the first planetary gear unit G1 is fixed to a transmission case 3 and thus it is constantly fixed. The first carrier PC1 is connectable to the second ring gear R2 through the first clutch C1, and furthermore, the first carrier PC1 is connectable to the second sun gear S2 through the second clutch C2.

The center member CM of the third carrier PC3 is connectable to the input shaft 1 through the third clutch C3, and thus the third clutch C3 can constitute a direct clutch that directly transmits the input rotation to a speed change mechanism that includes the second and third planetary gear units G2 and G3.

The outer member OM of the third carrier PC3 of the third planetary gear unit G3 is connectable to the transmission case 3 through the first brake B1, and thus the third carrier PC3 is fixable. The fourth sun gear S4 is connectable to the transmission case 3 through the second brake B2, and thus the fourth sun gear S4 is fixable.

Figure 2:
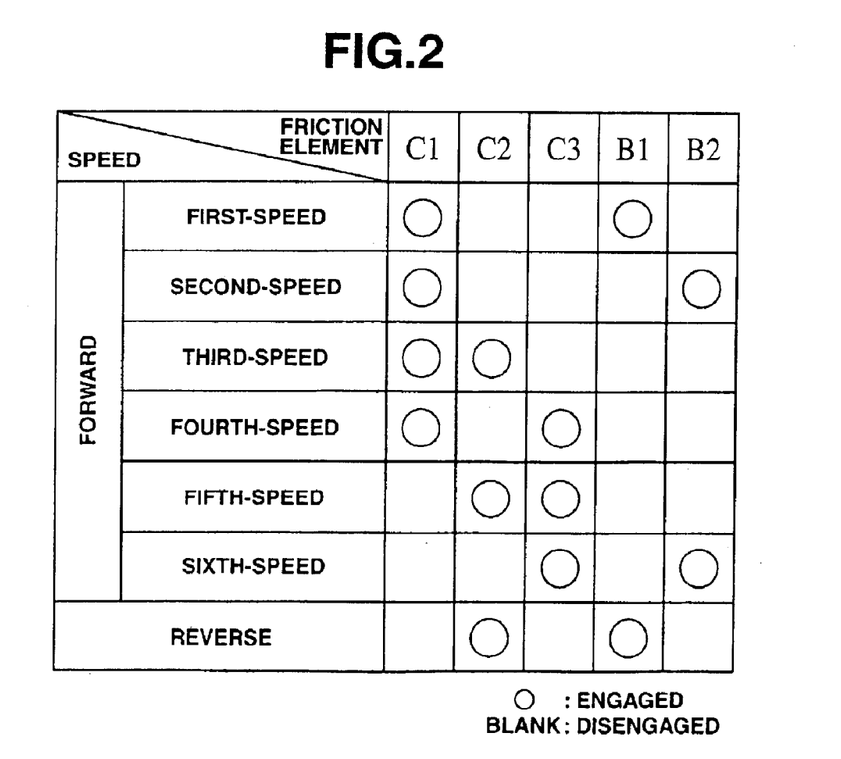
FIG. 2 is a table showing a relationship between ON/OFF condition of each friction element and speeds, which is established in the speed change mechanism of the present invention.

When the above-mentioned clutches C1, C2 and C3 and brakes B1 and B2 are engaged or disengaged in a manner as is indicated by the table of FIG. 2, six forward speeds and one reverse position can be selectively assumed by the speed change mechanism. Although not shown in the drawing, the frictional elements, viz., clutches C1, C2 and C3 and brakes B1 and B2, are driven or controlled by a control valve unit (not shown). The control valve unit may be of a hydraulic type, electronic type or a combination of these types.

In the following, operation of the speed change mechanism will be described with reference to FIGS. 2 to 9 of the drawings.

Figure 7:
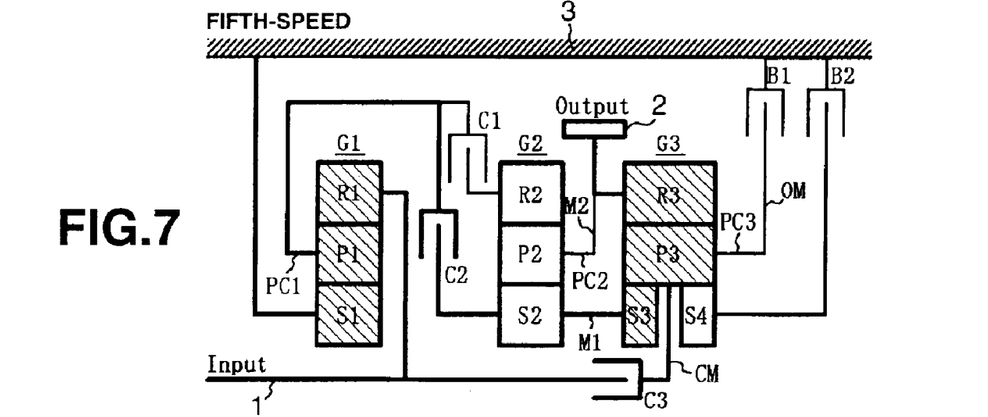
Figure 8:
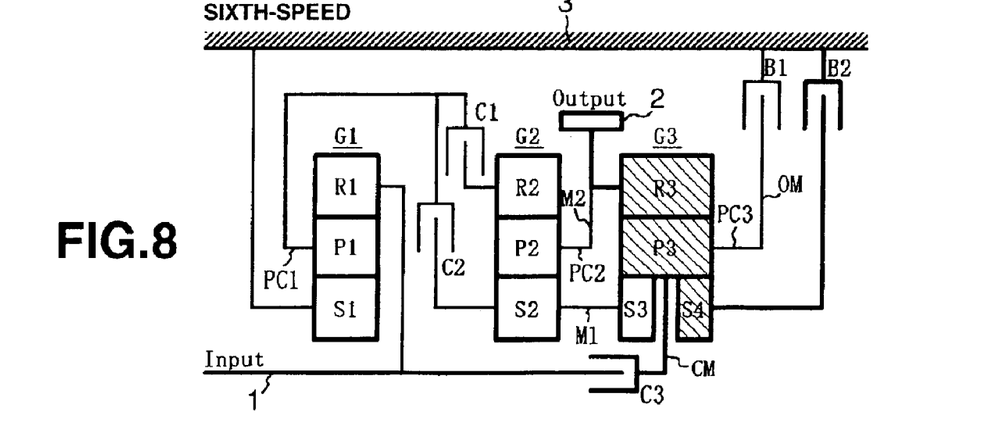
Figure 9:
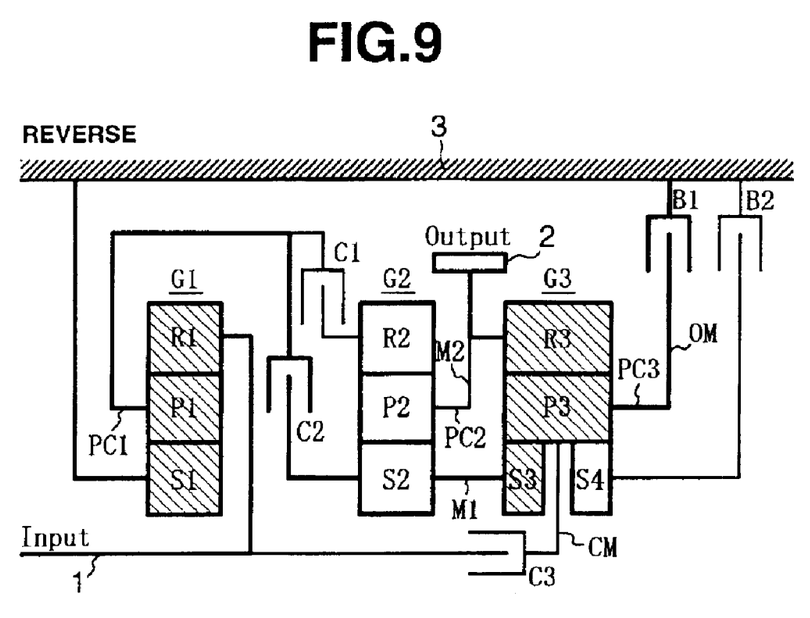
FIG. 9 is a view similar to FIG. 1, but showing a torque transmitting path established in a reverse position of the speed change mechanism of the present invention.

FIG. 2 is a table depicting the engaged/disengaged condition of each frictional element with respect to a speed (or reverse) assumed by the transmission (viz., speed change mechanism), FIGS. 3 to 8 are drawings showing torque transmitting paths established in first to sixth speeds of the speed change mechanism respectively and FIG. 9 is a drawing showing the torque transmitting path established in the reverse position of the speed change mechanism.

In FIGS. 3 to 9, the torque transmitting paths are illustrated by thicker lines and the elements that participate in the torque transmission are hatched.

First Speed

As is seen from the table of FIG. 2, in the first speed of the speed change mechanism, the first clutch C1 and the first brake B1 are engaged.

Figure 3:
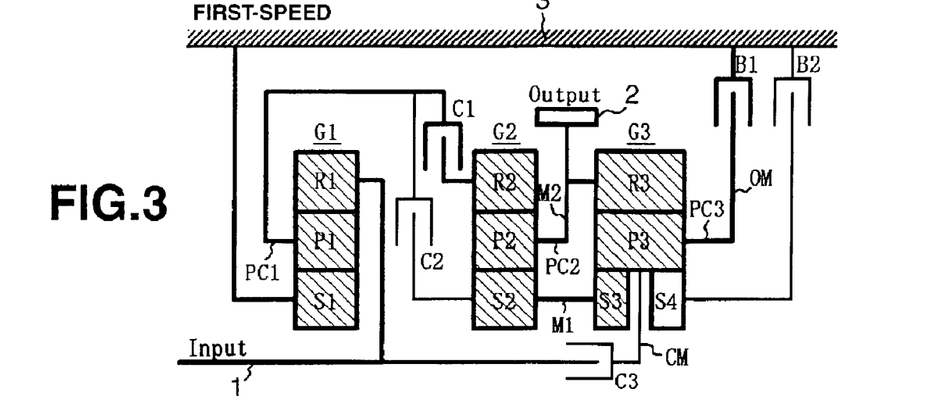
FIGS. 3 to 8 are views similar to FIG. 1, but showing torque transmitting paths established in first, second, third, fourth, fifth and sixth speeds of the speed change mechanism of the present invention, respectively.

As is seen from FIG. 3, in the first speed, due to the engagement of the first clutch C1, a reduced speed rotation of the first planetary gear unit G1 is inputted to the second ring gear R2 of the second planetary gear unit G2. In addition, due to the engagement of the first brake B1 inducing fixing of the third carrier PC3, rotation of the third ring gear R3 causes a reduced speed rotation of the third sun gear S3 in an opposite direction. The rotation of the third sun gear S3 is transmitted to the second sun gear S2 of the second planetary gear unit G2 through the first connecting structure M1.

Accordingly, at the second planetary gear unit G2, there are inputted a reduced speed rotation in a normal direction from the second ring gear R2 and a reduced speed rotation in an opposite direction from the second sun gear S2, so that a rotation whose speed is much reduced as compared with the rotation of the second ring gear R2 is transmitted to the output gear 2 through the second carrier PC2 and second connecting structure M2.

The torque transmitting path established in this first speed is illustrated by thicker lines. That is, the first clutch C1, the first brake B1, the first and second connecting structures M1 and M2, the outer member OM, the first and second planetary gear units G1 and G2 and the third planetary gear unit G3 except the fourth sun gear S4 are applied with a certain torque.

That is, in the first speed, the first planetary gear unit G1 and the second and third planetary gear units G2 and G3 which constitute the speed change mechanism behind the first planetary gear unit G1 participate in the torque transmission.

Second Speed

As is seen from the table of FIG. 2, in the second speed, the first clutch C1 and the second brake B2 are engaged. Thus, if the second speed would take place following the first speed, the first brake B1 is released and the second brake B2 is engaged.

Figure 4:
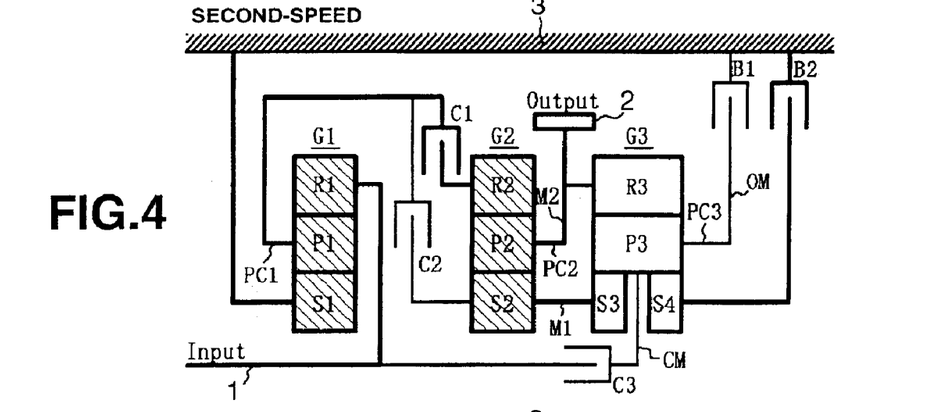

As is seen from FIG. 4, in the second speed, due to the engagement of the first clutch C1, a reduced speed rotation of the first planetary gear unit G1 is inputted to the second ring gear R2 of the second planetary gear unit G2. In addition, due to the engagement of the second brake B2, the fourth sun gear S4 is fixed to the transmission case 3 and thus the third sun gear S3 connected to the third pinions P3 is fixed, and the second sun gear 52 connected to the third sun gear S3 through the first connecting structure M1 is fixed to the transmission case 3.

Accordingly, at the second planetary gear unit G2, there is inputted a reduced speed rotation in a normal direction from the second ring gear R2 inducing fixing of the second sun gear S2, so that a rotation whose speed is much reduced as compared with the rotation of the second ring gear R2 (but higher than the rotation in the first speed) is transmitted to the output gear 2 through the second carrier PC2 and the second connecting structure M2.

The torque transmitting path established in this second speed is illustrated by thicker lines. That is, the first clutch C1, the second brake B2, the first and second connecting structures M1 and M2, and the first and second planetary gear units G1 and G2 are applied with a certain torque.

However, in the third planetary gear unit G3, due to turning of the third ring gear R3, the third pinions P3 is turned around both the third and fourth sun gears S3 and S4 which are fixed to the transmission case 3. Thus, even when serving as a rotation element, the third planetary gear unit G3 does not participate in the torque transmission.

Third Speed

As is seen from the table of FIG. 2, in the third speed, the first and second clutches C1 and C2 are engaged. Thus, if the third speed would take place following the second speed, the second brake B2 is released and the second clutch C2 is engaged.

Figure 5:
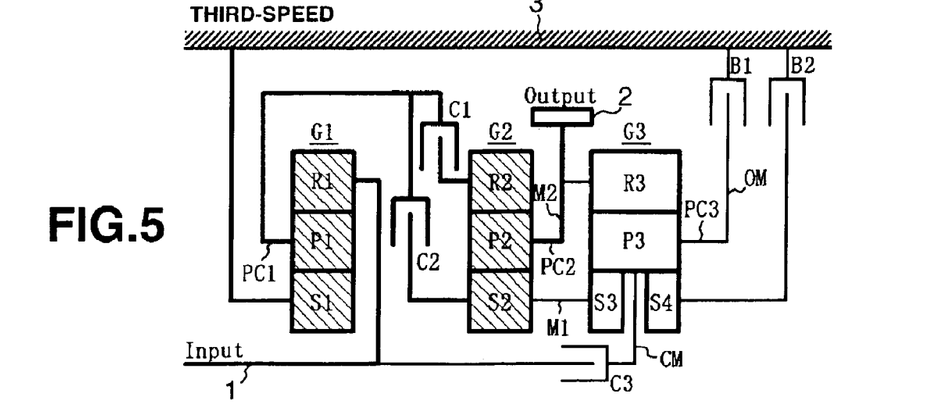

As is seen from FIG. 5, in the third speed, due to the engagement of the first clutch C1, a reduced speed rotation of the first planetary gear unit G1 is inputted to the second ring gear R2, and at the same time, due to the engagement of the second clutch C2, the reduced speed rotation is inputted to the second sun gear S2.

Accordingly, at the second planetary gear unit G2, there are inputted the same reduced speed rotations from the second ring gear R2 and the second sun gear S2, so that a reduced speed rotation (which is the same as that of the first planetary gear unit G1) is outputted from the second carrier PC2 which rotates integrally with the gears R2 and S2 to the output gear 2 through the second connecting structure M2.

The torque transmitting path established in this third speed is illustrated by thicker lines. That is, the first clutch C1, the second clutch C2, the second connecting structure M2, and the first and second planetary gear units G1 and G2 are applied with a certain torque.

It is to be noted that like in the second speed, the third planetary gear unit G3 does not participate in the torque transmission.

Fourth Speed

As is seen from the table of FIG. 2, in the fourth speed, the first and third clutches C1 and C3 are engaged. Thus, if the fourth speed would take place following the third speed, the second clutch C2 is released and the third clutch C3 is engaged.

Figure 6:
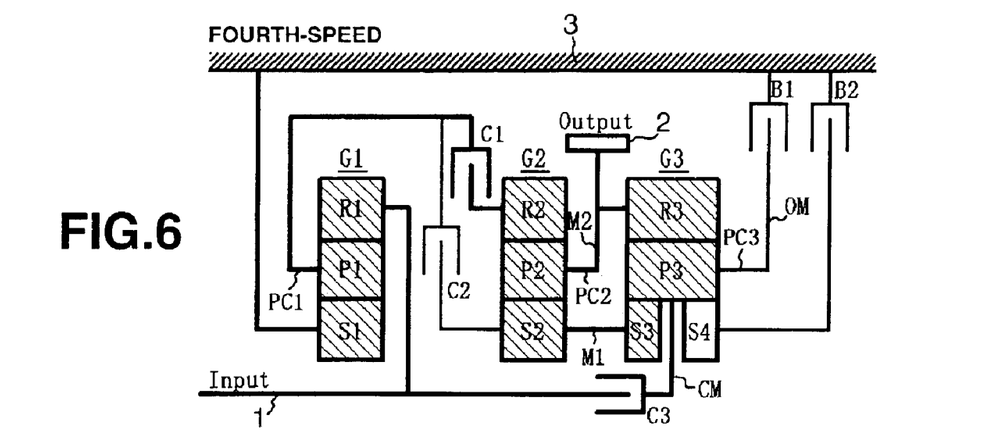

As is seen from FIG. 6, in the fourth speed, due to the engagement of the first clutch C1, a reduced speed rotation of the first planetary gear unit G1 is inputted to the second ring gear R2, and at the same time, due to the engagement of the third clutch C3, an input rotation of the input shaft 1 is inputted to the third carrier PC3 through the center member CM.

Accordingly, the rotation speed of the third sun gear S3 becomes higher than that of the third ring gear R3, and the rotation of the third sun gear S3 is transmitted to the second sun gear S2 through the first connecting structure M1.

Thus, at the second planetary gear unit G2, there are inputted a reduced speed rotation from the second ring gear R2 and an increased speed rotation from the second sun gear S2, and thus a rotation whose speed is higher than the reduced speed rotation of the second ring gear R2 (but lower than that of the input shaft 1) is outputted to the output gear 2 from the second carrier PC2 through the second connecting structure M2.

The torque transmitting path established in this fourth speed is illustrated by thicker lines. That is, the first clutch C1, the third clutch C3, the first and second connecting structures M1 and M2, the center member CM, the first and second planetary gear units G1 and G2 and the third planetary gear unit G3 except the fourth sun gear S4 are applied with a certain torque.

Fifth Speed

As is seen from the table of FIG. 2, in the fifth speed, the second and third clutches C2 and C3 are engaged. Thus, if the fifth speed would take place following the fourth speed, the first clutch C1 is released and the second clutch C2 is engaged.

As is seen from FIG. 7, in the fifth speed, due to the engagement of the second clutch C2, a reduced speed rotation of the first planetary gear unit G1 is inputted to the third sun gear S3 through the second sun gear S2 and the first connecting structure M1, and at the same time, due to the engagement of the third clutch C3, an input rotation of the input shaft 1 is inputted to the third carrier PC3 through the center member CM.

Accordingly, at the third planetary gear unit G3, the input rotation is applied to the third carrier PC3, and the reduced speed rotation of the first planetary gear unit G1 is inputted to the third sun gear S3, so that a rotation whose speed is higher than that of the input rotation is outputted to the output gear 2 through the third ring gear R3 and the second connecting structure M2.

The torque transmitting path established in this fifth speed is illustrated by thicker lines. That is, the second clutch C2, the third clutch C3, the first and second connecting structures M1 and M2, the center member CM, the first planetary gear unit G1 and the third planetary gear unit G3 except the fourth sun gear S4 are applied with a certain torque.

Sixth Speed

As is seen from the table of FIG. 2, in the sixth speed, the third clutch C3 and the second brake B2 are engaged. Thus, if the sixth speed would take place following the fifth speed, the second clutch C2 is released and the second brake B2 is engaged.

As is seen from FIG. 8, in the sixth speed, due to the engagement of the third clutch C3, the input rotation of the input shaft 1 is inputted to the third carrier PC3 through the center member CM of the third planetary gear unit G3, and at the same time, due to the engagement of the second brake B2, the fourth sun gear S4 of the third planetary gear unit G3 is fixed to the transmission case 3.

Accordingly, at the third planetary gear unit G3, there is inputted the input rotation into the third carrier PC3, so that because of the fixing of the fourth sun gear S4, a rotation whose speed is higher than that of the input rotation is outputted to the output gear 2 from the third ring gear R3 through the second connecting structure M2.

The torque transmitting path established in this sixth speed is illustrated by thicker lines. That is, the third clutch C3, the second brake B2, the second connecting structure M2 and the third planetary gear unit G3 except the third sun gear S3 are applied with a certain torque.

Reverse

As is seen from the table of FIG. 2, in the reverse, the second clutch C2 and the first brake B1 are engaged.

As is seen from FIG. 9, in the reverse position, due to the engagement of the second clutch C2, a reduced speed rotation of the first planetary gear unit G1 is inputted to the third sun gear S3 through the second sun gear S2 and the first connecting structure M1, and at the same time, due to the engagement of the first brake B1, the third carrier PC3 is fixed to the transmission case 3.

Accordingly, at the third planetary gear unit G3, there is inputted a reduced speed rotation in a normal direction to the third sun gear S3, so that because of the fixing of the third carrier PC3, a reduced speed rotation in a reverse direction is outputted from the third ring gear R3 to the output gear 2 through the second connecting structure M2.

The torque transmitting path established in this reverse position is illustrated by thicker lines. That is, the second clutch C2, the first brake B1, the first and second connecting structures M1 and M2, the outer member OM, the first planetary gear unit G1 and the third planetary gear unit G3 except the fourth sun gear S4 are applied with a certain torque.

Figure 10:
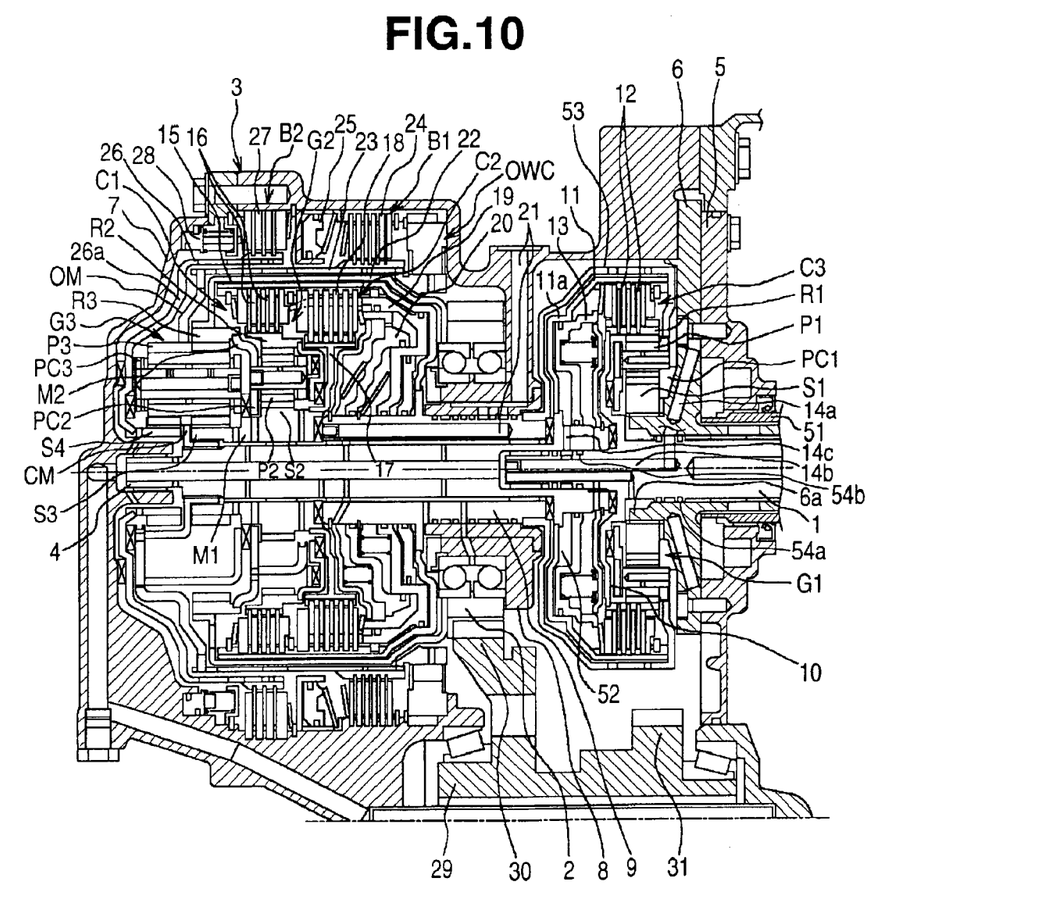
FIG. 10 is a schematic view of the speed change mechanism of the present invention.
Figure 11:
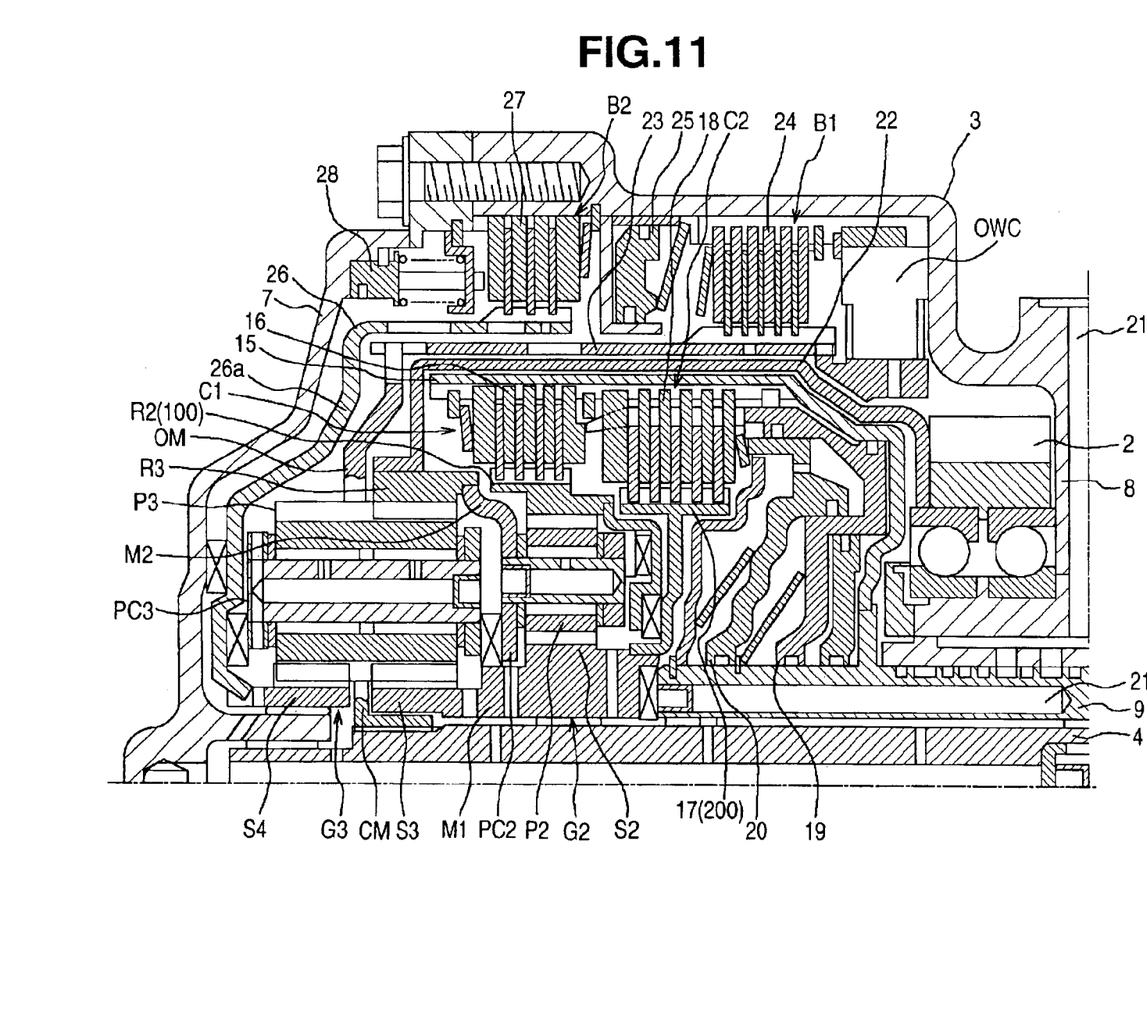
FIG. 11 is an enlarged view of a part of the view of FIG. 10, which is essential in the present invention.

Referring to FIGS. 10 and 11, particularly FIG. 10, there is shown in a sectional manner the speed change mechanism of automatic transmission, to which the present invention is practically applied. FIG. 11 is an enlarged view of an essential part of the speed change mechanism of the invention.

In the following, the detailed construction of the speed change mechanism of the present invention will be described with reference to the drawings.

It is to be noted that FIGS. 10 and 11 are drawings with input and output portions of the speed change mechanism shown at right and left portions of the drawings, which is reversed to case of FIGS. 1 and 3 to 9.

For ease of understanding, various directional terms, such as, right, left, upper, lower, rightward, etc., will be used in the following description. However, such terms are to be understood with respect to only the drawing or drawings on which a corresponding part or portion is shown.

As is seen from the drawings, within the transmission case 3, there are coaxially installed the input shaft 1 and an intermediate shaft 4. These two shafts 1 and 4 are coaxially rotatable to each other. A front opening of the transmission case 3 is covered with a pump case that comprises a pump housing 5 and a pump cover 6. The pump case has the input shaft 1 passed therethrough. Bearings (no numerals) are arranged between the pump housing and the input shaft 1 for bearing the input shaft 1. A rightward leading end of the input shaft 1 is connected to an output element of a torque converter (not shown) that is driven an engine (not shown).

Within the pump case, there are arranged pump elements to constitute an oil pump that is directly driven by the engine through a pump drive shaft 51. A left end of the intermediate shaft 4 is rotatably supported by an rear end lid 7 of the transmission case 3.

In an axially middle portion of the transmission case 3, there is provided an intermediate wall 8 around which the output gear 2 is rotatably supported. In a center opening of the intermediate wall 8, there is arranged a hollow shaft 9 through which mutually engaged portions of the input shaft 1 and the intermediate shaft 4 are rotatably held.

As is seen from FIG. 10, in a front open space of the transmission case 3 that is defined between the oil pump case (5, 6) and the intermediate wall 8, there is arranged the first planetary gear unit G1. The third clutch C3 is arranged to surround the first planetary gear unit G1.

In the first planetary gear unit G1, the first sun gear Si is immovably held on a center boss portion 6a of the pump cover 6 through a serration connection. With this, the first sun gear S1 can serve as a reaction force holder. The first ring gear R1 serving as a rotation input member is mounted to a peripheral portion of a flange 10 which extends radially outward from the input shaft 1.

A clutch drum 11 extends radially outward from a front end of the intermediate shaft 4 and surrounds the first ring gear R1.

In an annular clearance defined between the clutch drum 11 and the first ring gear R1, there is arranged the third clutch C3. The third clutch C3 comprises a clutch pack 12 that includes alternatively put first and second groups of clutch plates, the first group effecting a spline-engagement with an inner surface of the clutch drum 11 and the second group effecting the spline-engagement with an outer surface of the first ring gear R1. As shown, the third clutch C3 is arranged around the first planetary gear unit G1. The first ring gear R1 can serve as a clutch hub of the third clutch C3.

A clutch piston 13 of the third clutch C3 is located at a position opposite to the oil pump case (5, 6) with respect to the first planetary gear unit G1. Thus, the clutch piston 13 is coupled with both an end wall 11a of the clutch drum 11 and a front end of the intermediate shaft 4 which face the first planetary gear unit G1.

Between the third clutch piston 13 and the end wall 11a of the clutch drum 11, there is defined a chamber 52 which is connected to the control valve unit (not shown) through a third clutch working oil passage which comprises an oil passage 14a formed in the pump cover 6, an oil passage 14b formed in the input shaft 1 and an oil passage 14c formed in the intermediate shaft 4. A connecting portion between the oil passages 14a and 14b is sealed from the surrounding by seal rings 54a that are disposed between the input shaft 1 and the pump cover 6, and a connecting portion between the oil passages 14b and 14c is sealed from the surrounding by seal rings 54b that are disposed between the input shaft 1 and the intermediate shaft 4.

Accordingly, when receiving a pressurized working oil from the control valve unit through the oil passages 14a, 14b and 14c, the third clutch piston 13 is moved rightward in the drawing establishing an engaged condition of the third clutch C3.

A drum-shaped connecting member 53 extends radially outward from the front end of the hollow shaft 9 in a manner to cover the third clutch C3. The connecting member 53 has a front end connected to the first carrier PC1.

As has been mentioned hereinabove, the first carrier PC1 serves as a rotation output member of the first planetary gear unit G1.

In a space defined between the intermediate wall 8 and the rear end lid 7, there are installed the speed change mechanism including the second and third planetary gear units G2 and G3, the first and second clutches C1 and C2 and the first and second brakes B1 and B2 in such a manner as is shown by FIGS. 10 and 11.

The second and third planetary gear units G2 and G3 are coaxially disposed on the intermediate shaft 4, and the second planetary gear unit G2 is positioned closer to the input shaft 1 than the third planetary gear unit G3 is.

The second sun gear S2 of the second planetary gear unit G2 and the third sun gear S3 of the third planetary gear unit G3 are connected by the first connecting structure M1 and rotatably mounted on the intermediate shaft 4.

A clutch drum 15 extends radially outward from a middle portion of the hollow shaft 9 and extends axially rearward to cover the second ring gear R2.

In an annular clearance defined between the clutch drum 15 and the second ring gear R2, there is arranged the first clutch C1. The first clutch C1 comprises a clutch pack 16 that includes alternatively put first and second groups of clutch plates, the first group effecting a spline-engagement with an inner surface of the clutch drum 15 and the second group effecting the spline-engagement with an outer surface of the second ring gear R2. As shown, the first clutch C1 is arranged around the second planetary gear unit G2. The second ring gear R2 can serve as a clutch hub of the first clutch C1.

As is described hereinabove, the second clutch C2 is positioned closer to the input shaft 1 than the first clutch C1 is. The first clutch C1 is arranged around the second planetary gear unit G2. That is, the second clutch C2 is positioned away from the third planetary gear unit G3 as compared with the first clutch C1. A clutch hub 17 extends radially outward from a rear end of the second sun gear S2, which has an annular plate portion.

In annular clearance defined between the annular plate portion of the clutch hub 17 and the clutch drum 15, there is arranged the second clutch C2. The second clutch C2 comprises a clutch pack 18 that includes alternatively put first and second groups of clutch plates, the first group effecting a spline-engagement with an inner surface of the clutch drum 15 and the second group effecting a spline-engagement with an outer surface of the annular plate portion of the clutch hub 17.

A clutch piston 19 of the first clutch C1 and a clutch piston of the second clutch C2 constitute a so-called double piston structure in which the clutch piston 20 is coaxially movable within the clutch piston 19, and the two pistons 19 and 20 are positioned closer to the second clutch C2, that is, away from the first clutch C1. With this arrangement, the clutch piston 20 is coupled with an end wall of the clutch drum 15, the end wall facing the second planetary gear unit G2.

Upon receiving a pressurized working oil from the control valve unit through respective oil passages 21 formed in the intermediate wall 8 and the hollow shaft 9, the two clutch pistons 19 and 20 are coaxially moved separately. That is, when these pistons 19 and 20 are moved leftward in the drawing, the first and second clutches C1 and C2 assume their engaged condition.

As has been mentioned hereinabove, the third planetary gear unit G3 is of double sun gear type. A face width of the third ring gear R3 is made smaller than that of each of the third pinions P3, so that the third ring gear R3 is meshed with the third pinions P3 at a position near the second planetary gear unit G2. Thus, the second connecting structure M2 through which the third ring gear R3 is connected to the second carrier PC2 of the second planetary gear unit G2 can be shortened.

To the peripheral portion of the third ring gear R3, there is connected an end of a cylindrical connecting member 22 that surrounds the clutch drum 15 of the first and second clutches C1 and C2. The other end of the cylindrical connecting member 22 is connected to the output gear 2 to rotate therewith.

To the third carrier PC3 of the third planetary gear unit G3, there is provided the center member CM which extends radially inward from the third carrier PC3 between the third and fourth sun gears S3 and S4, and to an axially middle parts of the third pinions P3, there is provided the outer member OM which extends radially outward from the third pinions P3 along an end surface of the third ring gear R3.

The center member CM is connected with the intermediate shaft 4, so that the third carrier PC3 is connected to the clutch drum 11 of the third clutch C3 through the center member CM and the intermediate shaft 4.

The outer member OM is provided at its peripheral portion with a brake hub 23. The brake hub 23 is arranged around the cylindrical connecting member 22 and extends forward to the intermediate wall 8.

In an annular clearance defined between a front end portion of the brake hub 23 and the transmission case 3, there is arranged the first brake B1. The first brake B1 comprises a clutch pack 24 that includes alternatively put first and second groups of clutch plates, the first group effecting a spline-engagement with an inner surface of the transmission case 3 and the second group effecting the spline-engagement with an outer surface of the front end portion of the brake hub 23. Behind the brake pack 24, there is arranged a brake piston 25. That is, when the brake piston 25 is moved rightward in the drawing, the first brake B1 assumes its engaged condition.

A brake hub 26 is arranged to surround a rear end portion of the brake hub 23. The brake hub 23 has a rear end wall 26a that extends radially inward along the back portion of the third planetary gear unit G3. The rear end wall 26a is secured at its inward end to the fourth sun gear S4 of the third planetary gear unit G3.

In an annular clearance defined between the brake hub 26 and the transmission case 3, there is arranged the second brake B2. The second brake B2 comprises a clutch pack 27 that includes alternatively put first and second groups of clutch plates, the first group effecting a spline-engagement with an inner surface of the transmission case 3 and the second group effecting the spline-engagement with an outer surface of the brake hub 26. Behind the brake pack 17, there is arranged a brake piston 28. When the brake piston 28 is moved rightward in the drawing, the second brake B2 assumes its engaged condition.

As is described hereinabove, the first and second brakes B1 and B2 are arranged around the first and second clutches C1 and C2. But, the first brake B1 is positioned closer to the input shaft 1 (or the first planetary gear unit G1) than the second brake B2 is, and these first and second brakes Be and B2 are positioned closer to the second planetary gear unit G2 than the third planetary gear unit G3.

Between a front end of the brake hub 23 of the first brake B1 and the transmission case 3, there is arranged a one-way clutch OWC. When, with the first brake B1 kept released, the one-way clutch OWC suppresses rotation of the third carrier PC3 in a direction, the forward first speed is obtained.

In case of the first brake effected by the operation of the one-way clutch OWC, engine brake is not obtained because the one-way clutch OWC permits a reversed rotation of the third carrier PC3 under engine brake. Accordingly, upon need of the engine brake, the first brake B1 is engaged for suppressing the reversed rotation of the third carrier PC3.

As is seen from FIG. 10, within the transmission case 3, there is arranged a countershaft 29 which extends in parallel with the input and intermediate shafts 1 and 4 and is rotatable about its axis. The countershaft 29 has both a counter gear 30 and a final drive pinion 31 integrally formed thereon. The counter gear 30 is meshed with the output gear 2, and the final drive pinion 31 is meshed with an input gear of a differential gear device (not shown) for drive road wheels.

As has been mentioned hereinabove, in the speed change mechanism of the invention, the second planetary gear unit G2 is of a single pinion type and the third planetary gear unit G3 is of a double sun gear type. These units G2 and G3 constitute the speed change mechanism that is arranged behind the first planetary gear unit G1 of single pinion type. In the two clutches C1 and C2, the first clutch C1 can transmit a reduced speed rotation from the first planetary gear unit G1 to the second ring gear R2 of the second planetary gear unit G2, and the second clutch C2 can transmit a reduced speed rotation from the first planetary gear unit G1 to the second sun gear S2 of the second planetary gear unit G2. Furthermore, the first clutch C1 is located near the second planetary gear unit G2 (single pinion type) and the second clutch C2 is located beside the first clutch C1 at a position that is away from the third planetary gear unit G3 (double sun gear type) as compared with the second planetary gear unit G2 (single pinion type).

Accordingly, the speed change mechanism of the present invention has the following advantages.

That is, as is seen from FIGS. 1 and 11, the input rotation from the second clutch C2 is transmitted to the second sun gear S2 of the second planetary gear unit G2 through the clutch hub 17 (or 200, see FIG. 1) and the input rotation from the first clutch C1 is transmitted to the second ring gear R2 of the same planetary gear unit G2 through a part (100, see FIG. 1) of the second ring gear R2.

Thus, as is seen from FIGS. 10 and 11, even when the clutch hub 17 (or 200) and the part 100 of the second ring gear R2 are arranged at the same side of the second planetary gear unit G2, such members 17 and 100 have no portions concentrically overlapped, which suppresses enlargement of the speed change mechanism in a radial direction.

Both the first and second clutches C1 and C2 are located close to the second planetary gear unit G2. This arrangement brings about non-necessity of arranging clutches in an annular space defined around the third planetary gear unit G3 (double sun gear type) that is positioned away from the first planetary gear unit G1 (single pinion type). Accordingly, as is seen from FIGS. 10 and 11, the annular space can be used for neatly receiving a rear end (viz., rear end lid 7) of the transmission case 3, which brings about a reduction in axial length of the speed change mechanism, that is, downsizing of the transmission case 3.

For achieving the above-mentioned advantages, the speed change mechanism of the invention has the following arrangements.

The third carrier PC3 of the third planetary gear unit G3 is arranged to selectively transmit the input rotation without changing the speed and arranged fixable by the first brake B1. The fourth sun gear S4 of the third planetary gear unit G3 that is positioned away from the second planetary gear unit G2 is arranged fixable by the second brake B2. The third sun gear S3 of the third planetary gear unit G3 that is positioned near the second planetary gear unit G2 is connected to the second sun gear S2 of the second planetary gear unit G2 to constitute a first unit, so that a speed changed input rotation is transmitted to the first unit from the second clutch C2. A speed changed input rotation from the first clutch C1 is transmittable to the second ring gear R2 of the second planetary gear unit G2. The second carrier PC2 of the second planetary gear unit G2 and the third ring gear R3 of the third planetary gear unit G3 are connected to constitute a second unit, so that the output rotation of the transmission is outputted from the second unit through the second gear 2.

In the speed change mechanism of the invention, the first clutch C1 is arranged around the second planetary gear unit G2 and the second ring gear R2 of the second planetary gear unit G2 is arranged to serve as the clutch hub of the first clutch C1. Accordingly, there is no need of providing a connecting member between the first clutch C1 and the second ring gear R2 of the second planetary gear unit G2, which brings about a compact and low cost production of the speed change mechanism.

The clutch hub 17 of the second clutch C2 is arranged at the position that is near the second planetary gear unit G2 and far from the third planetary gear unit G3, and the clutch hub 17 is connected to the second sun gear S2 of the second planetary gear unit G2. Thus, the connecting member extending between the second clutch C2 and the second sun gear S2 of the second planetary gear unit G2 can have a reduced length, which brings about an assured strength of the connecting member as well as a smaller and low cost production of the speed change mechanism.

Furthermore, in the present invention, the first and second clutches C1 and C2 are constructed to have the common clutch drum 15 to which the reduced speed rotation from the first planetary gear unit G1 is transmitted. Accordingly, the number of parts is reduced and thus the cost of the speed change mechanism is reduced.

The entire contents of Japanese Patent Application 2002-207290 (filed Jul. 16, 2002) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A speed change mechanism of an automatic transmission, comprising:
   a single pinion type planetary gear unit concentrically disposed on a position of a given axis and includes a sun gear, pinions meshed with the sun gear, a ring gear meshed with the pinions and a carrier rotatably carrying the pinions;
   a double sun gear type planetary gear unit concentrically disposed on the other position of the given axis and includes two sun gears, pinions meshed with the two sun gears, a ring gear meshed with the pinions and a carrier rotatably carrying the pinions;
   first and second brakes concentrically arranged on different positions of the given axis, the first brake being arranged to selectively fix the carrier of the double sun gear type planetary gear unit and the second brake being arranged to selectively fix one of the two sun gears of the double sun gear type planetary gear unit; and
   first and second clutches coaxially arranged on different positions of the given axis to transmit a speed changed rotation to rotational elements of the two planetary gear units to provide the automatic transmission with a desired speed or position,
   wherein the first clutch is arranged to transmit the speed changed rotation to the ring gear of the single pinion type planetary gear unit, and the second clutch is arranged to transmit the speed changed rotation to the sun gear of the single pinion type planetary gear unit; and
   wherein the first clutch is concentrically arranged around the single pinion type planetary gear unit, and the second clutch is coaxially arranged beside the first clutch at a position that is a first distance apart from the double sun gear type planetary gear unit and a second distance apart from the single pinion type planetary gear unit, the first distance being greater than the second distance.

2. A speed change mechanism as claimed in claim 1, in which the single pinion type planetary gear unit is positioned at a third distance apart from an input shaft driven by an engine, the double sun gear type planetary gear unit is positioned at a fourth distance apart from the input shaft, and the third distance is less than the fourth distance.

3. A speed change mechanism as claimed in claim 1, in which the carrier of the double sun gear type planetary gear unit is arranged to selectively transmit the input rotation without changing the speed and fixable by the first brake, one of the two sun gears of the double sun gear type planetary gear unit that is away from the single pinion type planetary gear unit is arranged to be fixable by the second brake, the other sun gear of the double sun gear type planetary gear unit that is near the single pinion type planetary gear unit is connected to the sun gear of the single pinion type planetary gear unit to constitute a first unit, so that the speed changed rotation from the second clutch is transmitted to the first unit, the speed changed rotation from the first clutch is transmitted to the ring gear of the single pinion type planetary gear unit, and the carrier of the single pinion type planetary gear unit is connected to the ring gear of the double sun gear type planetary gear unit to constitute a second unit, so that the second unit outputs an output rotation of the transmission.

4. A speed change mechanism as claimed in claim 1, in which the ring gear of the single pinion type planetary gear unit is constructed to serve as a hub of the first clutch.

5. A speed change mechanism as claimed in claim 1, in which a clutch hub of the second clutch is positioned at one axial side of the single pinion type planetary gear unit that is positioned further apart from the double sun gear type planetary gear unit.

6. A speed change mechanism as claimed in claim 1, in which the first and second clutches have a common clutch drum to which the speed changed rotation is transmitted.

7. A speed change mechanism as claimed in claim 1, wherein the first and second brakes are disposed around the first and second clutches, respectively.

8. A speed change mechanism of an automatic transmission having an input shaft that is rotatable about an axis, the speed change mechanism comprising:
   a single pinion type planetary gear unit concentrically disposed at a position of the axis near the input shaft and includes a sun gear, pinions meshed with the sun gear, a ring gear meshed with the pinions and a carrier rotatably carrying the pinions;
   a double sun gear type planetary gear unit concentrically disposed at the other position of the axis away from the input shaft and includes two sun gears, pinions meshed with the two sun gears, a ring gear meshed with the pinions and a carrier rotatably carrying the pinions, the two sun gears being an inner sun gear directed toward the input shaft and an outer sun gear directed away from the input shaft;

first and second brakes coaxially arranged at different positions of the axis, the first brake selectively fixing the carrier of the double sun gear type planetary gear unit and the second brake selectively fixing the outer sun gear of the double sun gear type planetary gear unit; and first and second clutches coaxially arranged at different positions of the axis, the first clutch selectively transmitting a speed changed rotation to the ring gear of the single pinion type planetary gear unit, and the second clutch selectively transmitting a speed changed rotation to the sun gear of the single pinion type planetary gear unit, wherein the first and second clutches are arranged within a predetermined distance from the single pinion type planetary gear unit, and the second clutch is positioned in a space defined between the first clutch and the input shaft.

9. A speed change mechanism as claimed in claim 8, wherein the first and second brakes are disposed around the first and second clutches, respectively.

10. A speed change mechanism of an automatic transmission having an input shaft that is rotatable about an axis, the speed change mechanism comprising:

a single pinion type planetary gear unit concentrically disposed at a position of the axis near the input shaft and includes a sun gear, pinions meshed with the sun gear, a ring gear meshed with the pinions and a carrier rotatably carrying the pinions;

a double sun gear type planetary gear unit concentrically disposed at the other position of the axis away from the input shaft and includes two sun gears, pinions meshed with the two sun gears, a ring gear meshed with the pinions and a carrier rotatably carrying the pinions, the two sun gears being an inner sun gear directed toward the input shaft and an outer sun gear directed away from the input shaft;

first and second brakes coaxially arranged at different positions of the axis, the first brake selectively fixing the carrier of the double sun gear type planetary gear unit and the second brake selectively fixing the outer sun gear of the double sun gear type planetary gear unit;

first and second clutches coaxially arranged at different positions of the axis;

a first connecting member through which a speed changed rotation is transmitted to the ring gear of the single pinion type planetary gear unit from the first clutch; and a second connecting member through which a speed change is transmitted to the sun gear of the single pinion type planetary gear unit from the second clutch, wherein the first and second connecting members have no portions which are concentrically overlapped around the axis.

11. A speed change mechanism as claimed in claim 10, wherein the first and second brakes are disposed around the first and second clutches, respectively.

* * * * *